United States Patent
Chang et al.

(10) Patent No.: US 10,038,471 B2
(45) Date of Patent: Jul. 31, 2018

(54) METHOD AND APPARATUS FOR CANCELING SELF-INTERFERENCE

(71) Applicant: Electronics and Telecommunications Research Institute, Daejeon (KR)

(72) Inventors: Kapseok Chang, Daejeon (KR); Seon-Ae Kim, Daejeon (KR); Hyung Sik Ju, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 15/008,005

(22) Filed: Jan. 27, 2016

(65) Prior Publication Data

US 2016/0218769 A1    Jul. 28, 2016

(30) Foreign Application Priority Data

Jan. 27, 2015  (KR) .................. 10-2015-0013032
Jan. 27, 2016  (KR) .................. 10-2016-0010113

(51) Int. Cl.
*H04L 12/28*   (2006.01)
*H04B 1/525*   (2015.01)
*H04L 5/14*    (2006.01)

(52) U.S. Cl.
CPC ............... *H04B 1/525* (2013.01); *H04L 5/14* (2013.01)

(58) Field of Classification Search
CPC ........................................................ H04B 7/00
USPC ........................................................ 370/278
See application file for complete search history.

(56) References Cited

U.S. PATENT DOCUMENTS

| | | | |
|---|---|---|---|
| 8,570,933 B2 | 10/2013 | Lioliou et al. | |
| 2011/0130090 A1 | 6/2011 | Kwak et al. | |
| 2011/0216853 A1* | 9/2011 | Poklemba | H04L 27/00 375/316 |
| 2011/0216856 A1* | 9/2011 | Poklemba | H04L 27/00 375/340 |
| 2011/0244790 A1 | 10/2011 | Kwak et al. | |
| 2012/0063369 A1 | 3/2012 | Lin et al. | |

FOREIGN PATENT DOCUMENTS

| | | |
|---|---|---|
| KR | 1020110110733 A | 10/2011 |
| KR | 101301298 B1 | 8/2013 |

* cited by examiner

*Primary Examiner* — Dang Ton
(74) *Attorney, Agent, or Firm* — William Park & Associates Ltd.

(57) ABSTRACT

There are provided a method and an apparatus for performing a self-interference cancellation by determining a filter coefficient of an analog filter operated in an analog domain; and canceling self-interference generated in a received signal received by the node by a transmitted signal transmitted from the node, based on the filter coefficient.

17 Claims, 8 Drawing Sheets

METHOD AND APPARATUS FOR CANCELING SELF-INTERFERENCE

CROSS-REFERENCE TO RELATED APPLICATION

This application claims priority to and the benefit of Korean Patent Application Nos. 10-2015-0013032 and 10-2016-0010113 filed in the Korean Intellectual Property Office on Jan. 27, 2015, and Jan. 27, 2016, the entire contents of which are incorporated herein by reference.

BACKGROUND OF THE INVENTION (a) Field of the Invention

The present invention relates to a method and an apparatus for canceling self-interference for a received signal generated by a transmitted signal.

(b) Description of the Related Art

An inband full duplex (IFD) scheme, which is a technology receiving a signal at the same time of transmitting the signal in the same frequency band at the same time, may theoretically increase radio capacity up to two times as compared to a half duplex (HD) scheme which is currently adopted in a wireless communication system. FIG. 1 is concept view illustrating a half duplex system. Referring to FIG. 1, since nodes of the half duplex system transmit and receive signals using distributed times or frequencies, that is, use different time resources or frequency resources for transmitting and receiving the signals, it may easily maintain orthogonality between the transmitted and received signals. However, when the different time or frequency resources are used for transmitting and receiving the signals in the half duplex system, the resources may be wasted at double as compared to a full duplex system. Particularly, an IFD system is a solution for solving inefficiency of the half duplex system, and nodes of the IFD system may simultaneously transmit and receive the signal in the same band (i.e., the same frequency resource). The IFD system may theoretically increase link capacity up to two times as compared to the half duplex system. The IFD scheme is a technology that is necessarily required to achieve an object of increasing traffic capacity of a small radio device such as a smart phone by 1000 times, which is sought by fifth-generation (5G) mobile communication. However, in order to implement the IFD system, a self-interference signal needs to be cancelled. That is, a signal transmitted from a transceiver of the IFD system is easily introduced into a receiving end. As a result, there is a problem that a self-interference signal acts on an effective received signal as strong self-interference. A technology for canceling the above-mentioned self-interference is a self-interference cancellation (SIC) technology. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmitting and receiving node having an advantage of performing a self-interference cancellation. The present invention has been made in an effort to provide a method for canceling self-interference.

An exemplary embodiment of the present invention provides a transmitting and receiving node performing a self-interference cancellation. The transmitting and receiving node may include an analog filter operated in an analog domain and canceling self-interference generated in a received signal received by the node, by a transmitted signal transmitted from the node; and a controller determining a filter coefficient of the analog filter.

The transmitted signal may be transmitted in a transmitting phase included in a training filed of a time domain, and may not be transmitted in an empty phase included in the training field.

While a neighboring node of the node is operated in the transmitting phase, the node may be operated in the empty phase.

The node may be operated in an inband full duplex (IFD) scheme or a half duplex (HD) scheme.

The analog filter may be a finite impulse response (FIR) filter.

The controller may be operated in a digital domain.

The transmitting and receiving node may further include a channel/signal estimator baseband-sampling the transmitted signal and the received signal, wherein the controller may determine the filter coefficient based on the baseband-sampled transmitted signal and the baseband-sampled received signal, and a time delay value received from the analog filter.

The channel/signal estimator may baseband-sample the transmitted signal, and may then baseband-sample the received signal.

The channel/signal estimator may simultaneously baseband-sample the transmitted signal and the received signal.

The transmitting and receiving node may further include a distributor transmitting the transmitted signal generated from a transmit module of the node to an antenna, transmitting the received signal received through the antenna to a receive module of the node, and inputting a self-interference signal by the self-interference to the analog filter.

Another embodiment of the present invention provides a method for canceling self-interference of a transmitting and receiving node.

The method for canceling self-interference of a transmitting and receiving node may include determining a filter coefficient of an analog filter operated in an analog domain; and canceling self-interference generated in a received signal received by the node by a transmitted signal transmitted from the node, based on the filter coefficient.

The transmitted signal may be transmitted in a transmitting phase included in a training filed of a time domain, and may not be transmitted in an empty phase included in the training field.

While a neighboring node of the node is operated in the transmitting phase, the node may be operated in the empty phase.

The node may be operated in an inband full duplex (IFD) scheme or a half duplex (HD) scheme.

The analog filter may be a finite impulse response (FIR) filter. The determining of the filter coefficient of the analog filter may be performed in a digital domain by a controller of the node.

The method may further include baseband-sampling the transmitted signal and the received signal, wherein the determining of the filter coefficient of the analog filter includes determining the filter coefficient based on the baseband-sampled transmitted signal and the baseband-sampled received signal, and a time delay value received from the analog filter.

The baseband-sampling of the transmitted signal and the received signal may include baseband-sampling the transmitted signal, and then baseband-sampling the received signal.

The baseband-sampling of the transmitted signal and the received signal may include simultaneously baseband-sampling the transmitted signal and the received signal.

The method may further include transmitting the transmitted signal generated from a transmit module of the node to an antenna, transmitting the received signal received through the antenna to a receive module of the node, and inputting a self-interference signal by the self-interference to the analog filter.

According to an embodiment of the present invention, by efficiently estimating the filter coefficient of the analog filter for canceling the self-interference signal, it is possible to adapt to change in a surrounding environment across a wide band and it is possible to achieve low cost (a low duty cycle of a memory), low complexity, and low power consumption.

DETAILED DESCRIPTION OF THE EMBODIMENTS

Figure 1:
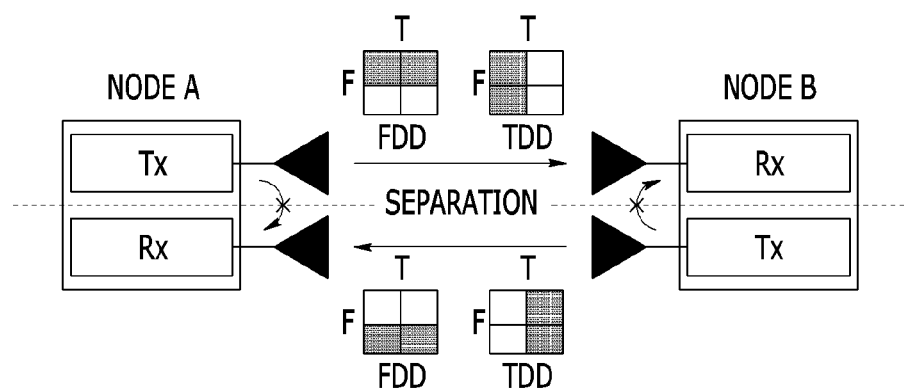
FIG. 1 is concept view illustrating a half duplex system.

Hereinafter, exemplary embodiments of the present invention will be described in detail with reference to the accompanying drawings so that those skilled in the art may easily practice the present invention. However, the present invention may be implemented in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Throughout the specification, a node may refer to a terminal, a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include functions of all or some of the MT, MS, AMS, HR-MS, SS, PSS, AT, UE, and the like.

Alternatively, the node may also refer to a base station (BS), an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto BS, a home node B (HNB), a home eNodeB (HeNB), a pico BS, a macro BS, a micro BS, or the like], and the like, and may include functions of all or some of the ABS, the nodeB, the eNodeB, the AP, the RAS, the BTS, the MMR-BS, the RS, the RN, the ARS, the HR-RS, the small base station, and the like.

Figure 2:
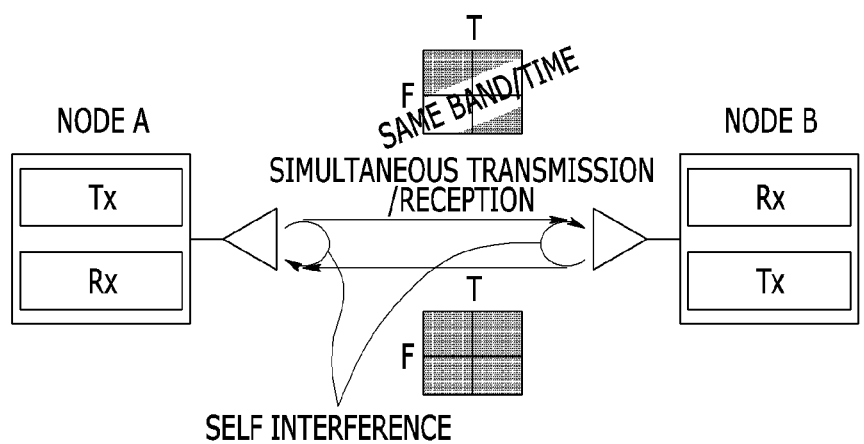
FIG. 2 is concept view illustrating an inband full duplex (IFD) system according to an exemplary embodiment.

FIG. 2 is concept view illustrating an inband full duplex (IFD) system according to an exemplary embodiment.

Referring to FIG. 2, since each node experiences self-interference of a transmitted signal for a received signal in an IFD system, an SIC technology is essential. For example, as the SIC technology, there is a propagation SIC technology of an antenna domain in which a transmit antenna and a receive antenna are physically spaced apart from each other by a significant interval. According to the propagation SIC technology, since the transmit and receive antennas are disposed to be spaced apart from each other by the significant interval, a self-interference level may be decreased and residual self-interference may be canceled in a digital domain. However, since the propagation SIC technology needs to secure the significant interval between the transmit and receive antennas, it is difficult to apply the propagation SIC technology to a small device. That is, since a physical constraint condition for the interval between the transmit and receive antennas exists in the small device, a technology capable of performing the SIC without physically spacing the transmit and receive antennas is required.

An SIC technology of an analog circuit domain may be classified into a passive SIC technology and an active SIC technology. The passive SIC technology that implements the SIC using a passive element, may easily obtain an SIC gain, but has a limit in a size of the gain. On the other hand, the active SIC technology is a technology capable of obtaining an SIC gain greater than that of the passive SIC technology. However, in the active SIC technology according to the related art, it is difficult to maintain a high SIC gain while rapidly adapting to a change in a surrounding environment across a wideband. Further, there is a disadvantage that high cost (use of a memory, etc.), high complexity, and high power are required.

Figure 3:
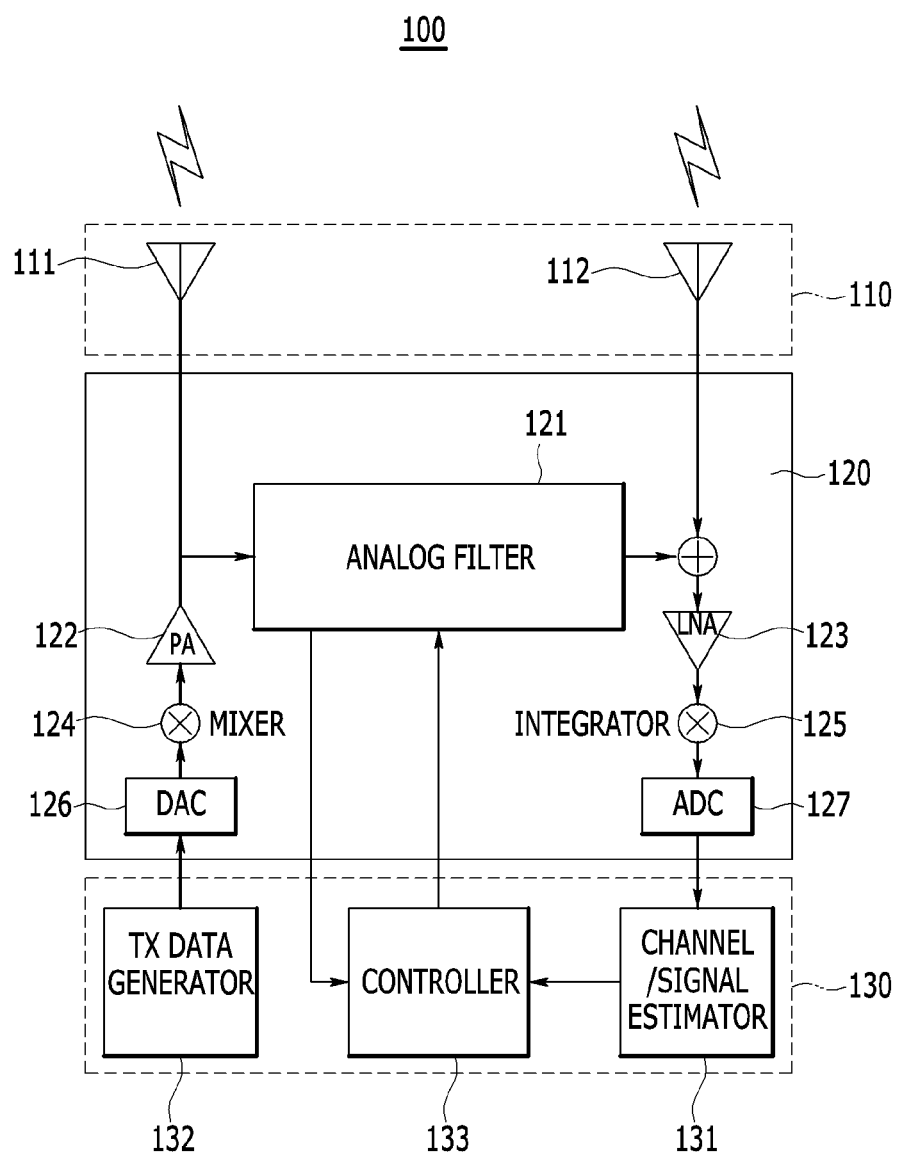
FIG. 3 is a block diagram illustrating a transmitting and receiving node according to an exemplary embodiment.

FIG. 3 is a block diagram illustrating a transmitting and receiving node according to an exemplary embodiment.

Referring to FIG. 3, a transmitting and receiving node 100 according to an exemplary embodiment includes an antenna unit 110, an analog circuit domain transceiver 120, and a baseband digital domain transceiver 130 that correspond to an antenna domain, an analog circuit domain, and a digital domain, respectively. In the present disclosure, the transmitting and receiving node may be operated in an IFD scheme or may be operated in an HD scheme.

The antenna unit 110 includes one transmit antenna 111 and one receive antenna 112. As a result, the transmitting and receiving node may obtain the SIC gain as many as a physical spaced interval between the transmit antenna 111 and the receive antenna 112, and spectrum efficiency is limited to a level similar to that of an existing HD scheme. That is, since the antenna unit 110 of the transmitting and receiving node 100 according to an exemplary embodiment includes one transmit antenna and one receive antenna, a spectrum efficiency aspect of the transmitting and receiving node 100 in an ideal environment in which there is no correlation of a channel between the antennas has no difference with the HD scheme using a 2×2 multi-input multi-output (MIMO) spatial multiplexing.

The analog circuit domain transceiver 120 includes an analog filter 121, a power amplifier (PA) 122, a low noise amplifier (LNA) 123, a mixer 124, an integrator 125, a local oscillator (LO) (not illustrated), a digital-to-analog converter (DAC) 126, an automatic gain controller (AGC) (not illustrated), and an analog-to-digital converter (ADC) 127.

The analog filter 121 cancels a self-interference signal introduced into a receive module through a receive antenna 120. Here, as the analog filter 121, an adaptive analog finite impulse response (FIR) filter, and the like may be used. In addition, the analog filter 121 may be briefly designed to prevent performance deterioration by variability of a hardware element. For example, the analog filter 121 may be constituted by taps using N delay lines and attenuators connected to the respective taps. Here, weights applied to the attenuators connected to the respective taps are generated by a channel/signal estimator 131 and a filter weight generator 133 included in the baseband digital domain transceiver 130, thereby making it possible to implement an interworking between the analog circuit domain transceiver 120 and the baseband digital domain transceiver 130.

The power amplifier 122 amplifies a transmitted signal converted into an RF signal by the mixer 124 and the local oscillator.

The low noise amplifier 123 amplifies a signal received through the receive antenna 120 to decrease noise.

The mixer 124 multiplies a sinusoidal signal corresponding to a carrier frequency $f_c$ generated by the local oscillator to an analog signal of a baseband (mathematical multiplication).

The integrator 125 performs a mathematical integration every a time period corresponding to a period of the sinusoidal signal, for a mathematical multiplication of an output signal of the low noise amplifier and the sinusoidal signal corresponding to the carrier frequency of the local oscillator to convert a received RF signal into the baseband signal.

The DAC 126 converts a digital signal into an analog signal. On the contrary, the ADC 127 converts the analog signal into the digital signal.

The AGC adjusts a gain of an input signal to a desired reference level.

The baseband digital domain transceiver 130 includes a channel/signal estimator 131, a Tx data generator 132, and a controller 133. According to an exemplary embodiment, the baseband digital domain transceiver 130 may include an Rx data generator (not illustrated).

The channel/signal estimator 131 estimates an impulse response of a self-interference signal formed in a received signal y(t) by a signal x(t) input from the analog filter 121 in a time domain. Further, the channel/signal estimator 131 estimates a signal obtained by performing a baseband equivalent over-sampling or a baseband sampling for x(t), and a signal obtained by performing the baseband equivalent over-sampling or the baseband sampling for y(t), and transmits estimation information according to the estimation to the controller 133.

The controller 133 calculates a coefficient of the analog filter 121 based on the estimation information received from the channel/signal estimator 131, and transmits the calculated coefficient to the analog filter 121. Thereafter, the coefficient calculated by the controller 133 may be applied to the analog filter 121.

The Tx data generator 132 performs encoding and modulating for data to be transmitted, and the Rx data generator performs demodulating and decoding for the received signal.

Figure 4:
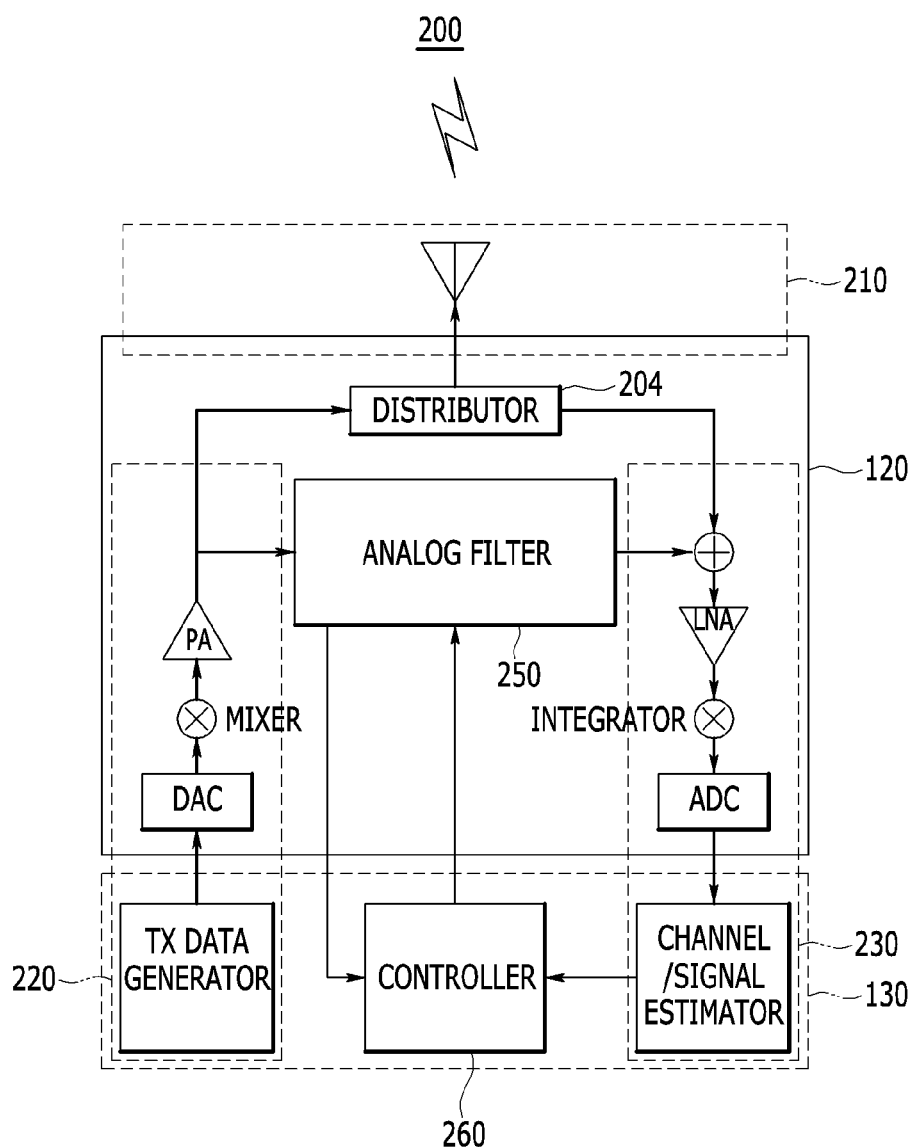
FIG. 4 is a block diagram illustrating a transmitting and receiving node according to another exemplary embodiment.

FIG. 4 is a block diagram illustrating a transmitting and receiving node according to another exemplary embodiment.

Referring to FIG. 4, a transmitting and receiving node 200 according to another exemplary embodiment includes a single transmit and receive sharing antenna as an antenna domain. That is, unlike the transmitting and receiving node 100 according to the exemplary embodiment of FIG. 3, the transmitting and receiving node 200 according to another exemplary embodiment illustrated in FIG. 4 may perform transmission and reception of a signal through one antenna. As a result, the SIC gain of the antenna domain may not be obtained by the transmitting and receiving node 200 according to another exemplary embodiment, but spectrum efficiency up to two times as compared to the existing HD scheme may be achieved, and the transmitting and receiving node may be easily mounted on the small device.

The transmitting and receiving node 200 according to another exemplary embodiment includes a distributor 240, which transmits a transmitted signal generated by a transmit module 220 to an antenna unit 210 and transmits a received signal received through the antenna unit 210 to a receive module 230. Here, due to hardware characteristics of the distributor 240, a leakage signal occurs. In this case, the transmitted signal corresponding to the leakage signal may be introduced into the receive module 230 as the self-interference signal. The distributor 240 that may be constituted as an analog element, may include, for example, a circulator, or an electrical balance duplexer (EBD) including a hybrid converter and a balance network. Here, it is noted that any analog element or circuit having a function similar to the circulator or the EBD may be applied as the distributor 240, and all of any analog element or circuit may be included in the scope of the present invention.

Referring to FIG. 4, the analog filter 250 cancels a self-interference signal introduced into a receive module 230 through the antenna unit 210 and the distributor 240. An input signal of the analog filter 250 may be a signal (i.e., a transmitted signal) passing through the PA or an internal signal of the distributor 240. In general, when the circulator is used as the distributor 240, the signal passing through the PA may be the input signal of the analog filter 250, and when the EBD is used as the distributor 240, the input signal may be the signal passing through the PA or the internal signal internally produced from the filter.

A PA, LNA, a mixer, an integrator, an LO, a DAC, a ADC, a AGC, a channel/signal estimator, a Tx data generator, and a controller 260 illustrated in FIG. 4 have the same functions as those of the transmitting and receiving node 100 illustrated in FIG. 3. Hereinafter, a method for canceling self-interference of the transmitting and receiving node 200 and a method for determining a filter coefficient of the analog filter 250 according to exemplary embodiments will be described in detail with reference to FIG. 5.

Figure 5:
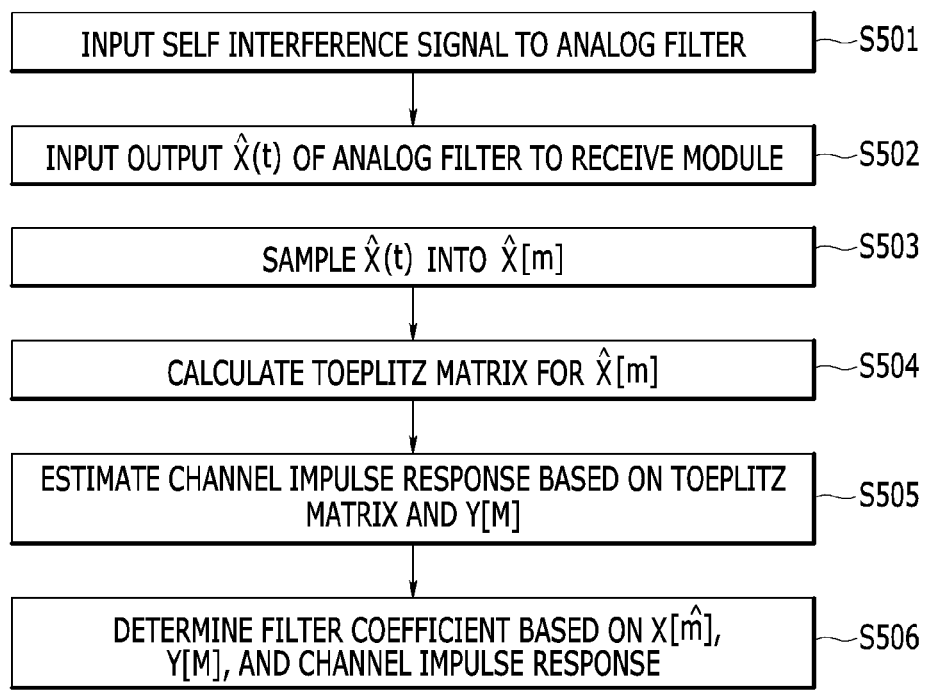
FIG. 5 is a flowchart of a method for controlling an analog filter according to an exemplary embodiment.

FIG. 5 is a flowchart of a method for canceling self-interference according to an exemplary embodiment.

Referring to FIG. 5, a transmitted signal generated from the transmit module is directly input to the analog filter as the self-interference signal, or is indirectly input to the analog filter through the distributor as the leakage signal (S501).

In the exemplary embodiment, it is assumed that the transmitted signal x(t) of the RF band has a band limited to a bandwidth W[Hz]. In the exemplary embodiment, W may be a system bandwidth of the baseband signal, or may also be a d times over-sampled bandwidth. In the following description, it is assumed that W is the d times over-sampled bandwidth for convenience. When a baseband equivalent signal of x(t) is $x_b(t)$, x(t) may be represented by the following Equation 1.

$$x(t) = \sqrt{2P} Re\{x_b(t) e^{-j2\pi f_c t}\} \quad \text{[Equation 1]}$$

In Equation 1, P denotes transmitted power amplified by the PA. In general, if x(t) has a band limited to the bandwidth W, $x_b(t)$ has a band limited to W/2. $x_b(t)$ may be represented by the following Equation 2.

$$x_b(t) = \sum_n x[n] \text{sinc}(Wt - n) \quad \text{[Equation 2]}$$

In Equation 2, x[n] denotes $x_b(n/W)$, and sinc(t) is represented by the following Equation 3.

$$\text{sinc}(t) = \frac{\sin(\pi t)}{\pi t} \quad \text{[Equation 3]}$$

Equation 2 is according to a sampling theorem that all of baseband waveforms having a band limited to W/2 may be represented by a linear combination of a coefficient value (i.e., x[n]) given by samples and orthogonal basis {sinc(Wt−n)}$_n$. In addition, a baseband equivalent signal $y_b(t)$ for the received signal y(t) of the RF domain is represented by the following Equation 4.

$$y_b(t) = \sum_n x[n] \sum_i a_i^b(t) \text{sinc}(tW - \tau_i(t)W - n) \quad \text{[Equation 4]}$$

In Equation 4, $a_i^b(t)$ is represented by the following Equation 5.

$$a_i^b(t) = a_i(t) e^{-j2\pi f_c \tau_i(t)} \quad \text{[Equation 5]}$$

In Equation 5, $a_i(t)$ and $\tau_i(t)$ each mean a path attenuation and a time delay produced by a multipath i at a time t. In addition, a received signal y[m] obtained by baseband-sampling yb(t) is represented by the following Equation 6. y[m] is equal to $y_b(m/W)$ (y[m]=$y_b$(m/W)).

$$y[m] = \sum_n x[n] \sum_i a_i^b(m/W) \text{sinc}[m - n - \tau_i(m/W)W] \quad \text{[Equation 6]}$$

The received signal y[m] obtained by performing the baseband-sampling may be equivalently considered as a projection for W sinc(Wt−n) of the received waveform $y_b(t)$. When m−n is l in Equation 6 (m−n=l), y[m] may be represented by Equation 7.

$$y[m] = \sum_l x[m - l] \sum_i a_i^b(m/W) \text{sinc}[l - \tau_i(m/W)W] \quad \text{[Equation 7]}$$

A right portion of a right term of Equation 7 may be represented by $h_l[m]$ as in Equation 8.

$$h_l[m] = \sum_i a_i^b(m/W) \text{sinc}[l - \tau_i(m/W)W] \quad \text{[Equation 8]}$$

Therefore, when Equation 7 is again represented using Equation 8, the received signal y[m] of the baseband may be represented by Equation 9.

$$y[m] = \sum_l h_l[m] x[m - l] \quad \text{[Equation 9]}$$

$h_l[m]$ of Equation 8 is a mathematical representation of an l-th (complex) channel filter tap in a sample m (or a time domain impulse response of a channel). A value of the channel filter tap is mainly a function of a gain $a_i^b(t)$ of the multipath, when the time delay value $\tau_i(t)$ of the multipath i approaches 1/W. In a special case in which the gain $a_i^b(t)$ of the multipath and the time delay $\tau_i(t)$ are time-invariant, Equation 8 may be represented by Equation 10.

$$h_l = \sum_i a_i^b \text{sinc}[l - \tau_i W] \quad \text{[Equation 10]}$$

That is, in Equation 10, the channel is linear time-invariant. It is assumed for convenience that the channel is linear time-invariant, and a received signal and a (complex) channel model modeled in Equation 9 and Equation 10 are not applied to only a wireless communication field, but may also be used even when modeling the self-interferenced received signal y[m] in the case in which a self-interferencesignal x[m] is introduced into the receive module in the transmitting and receiving node, and a channel occurring in the case in which the transmitted signal or the received signal passes through the distributor and the antenna unit. For example, the self-interferenced received signal may be mapped to y[m] of Equation 9, the channel at this time may be mapped to Equation 10, and the self-interference signal may be y[m−1] of Equation 9.

First, the analog filter generates x̂(t) as an output (S502). That is, x̂(t) is an output of the analog filter corresponding to the signal x(t) of the RF domain input to the analog filter. Thereafter, x̂(t) is input to the receive module, and is sampled by the ADC to be output in a form of x̂[m] (S503). The channel/signal estimator calculates Toeplitz matrix for the sampled baseband self-interference signal x̂[m] (m=0, 1, . . . , M−1) generated as an output of the ADC (S504). Toeplitz matrix for is x̂[m] represented by Equation 11.

$$A_{\hat{x}} = \begin{bmatrix} \hat{x}[c] & \ldots & \hat{x}[1] & \hat{x}[0] & 0 & \ldots & 0 \\ \hat{x}[c+1] & \ldots & \hat{x}[2] & \hat{x}[1] & \hat{x}[0] & 0 & 0 \\ \vdots & \vdots & \vdots & \vdots & \vdots & \vdots & \vdots \\ \hat{x}[2c-1] & \ldots & \hat{x}[c] & \hat{x}[c-1] & \ldots & \hat{x}[0] & 0 \\ \vdots & \vdots & \vdots & \vdots & \vdots & \vdots & \vdots \\ 0 & \hat{x}[M-1] & \ldots & \hat{x}[M-c] & \hat{x}[M-c-1] & \ldots & \hat{x}[M-2c] \\ \vdots & \vdots & \vdots & \vdots & \vdots & \vdots & \vdots \\ 0 & 0 & \ldots & \hat{x}[M-2] & \hat{x}[M-3] & \ldots & \hat{x}[M-c-2] \\ 0 & \ldots & 0 & \hat{x}[M-1] & \hat{x}[M-2] & \ldots & \hat{x}[M-c-1] \end{bmatrix}$$

[Equation 11]

In Equation 11, c means the number of non-causal elements (i.e., samples). The channel/signal estimator estimates an impulse response of a time domain of a given channel based on the baseband-sampled received signal y[m] and Toeplitz matrix for $\hat{x}$[m] (S505). Here, y[m] is represented by Equation 12, and the estimated impulse response of the time domain may be represented by Equation 13.

$$y = [y[0] y[1] \ldots y[m] \ldots y[M-1]]^T \qquad \text{[Equation 12]}$$

$$\hat{h} = [\hat{h}_0 \hat{h}_1 \ldots \hat{h}_l \ldots \hat{h}_{2c}]^T = A_{\hat{x}}^{\dagger} y \qquad \text{[Equation 13]}$$

In Equation 13, $A_{\hat{x}}^{\dagger}$ is a pseudo-inversion of Toeplitz matrix $A_{\hat{x}}$. Meanwhile, when Equation 10 is again represented by substituting Equation 5 into Equation 10, Equation 14 is represented.

$$h_l = \sum_i a_i e^{-j2\pi f_c \tau_i} \text{sinc}[l - \tau_i W] \qquad \text{[Equation 14]}$$

Equation 14 means an impulse response of a time domain of a channel of the received signal (mainly, the self-interference signal) formed in the receive module. In Equation 14, $T_i$ means an actual time delay value for the multipath l, and is the time delay value of the transmitted signal received by the controller from the analog filter.

In addition, the controller may represent the impulse response $\hat{h}_l$ of the time domain estimated according to Equation 13 as in Equation 15 based on Equation 14.

$$\hat{h}_l = \sum_{j=0}^{N-1} \hat{a}_j e^{-j2\pi f_c d_j} \text{sinc}[l - d_j W] \qquad \text{[Equation 15]}$$

In Equation 15, $d_j$ means the time delay value by a filter tap (corresponding to a multipath delay i of Equation 14) of the signal, input from the analog filter, and $\hat{a}_j$ means a filter coefficient for the analog filter generated by the controller. That is, the controller may receive the time delay value of the transmitted signal from the analog filter, estimate a, determine the filter coefficient of the analog filter based on the time delay value of the transmitted signal received from the analog filter and the channel impulse response estimated by the channel/signal estimator (S506). Here, the filter coefficient determined by the controller may be applied to the analog filter through an interworking with the analog filter. Here, a matrix representation of Equation 15 is represented by Equation 16.

$$\hat{h} = sa^b \qquad \text{[Equation 16]}$$

In Equation 16, s may be represented by Equation 17.

$$s = \begin{bmatrix} \text{sinc}(0 - d_0 W) & \text{sinc}(0 - d_1 W) & \ldots & \text{sinc}(0 - d_{N-1} W) \\ \text{sinc}(1 - d_0 W) & \text{sinc}(1 - d_1 W) & \ldots & \text{sinc}(1 - d_{N-1} W) \\ \vdots & \vdots & \ldots & \vdots \\ \text{sinc}(2c - d_0 W) & \text{sinc}(2c - d_1 W) & \ldots & \text{sinc}(2c - d_{N-1} W) \end{bmatrix}$$

[Equation 17]

In addition, in Equation 16, $a^b$ may be represented by Equation 18.

$$a^b = [\hat{a}_0 e^{-j2\pi f_c d_0} \hat{a}_1 e^{-j2\pi f_c d_1} \ldots \hat{a}_{N-1} e^{-j2\pi f_c d_{N-1}}]^T \qquad \text{[Equation 18]}$$

In Equation 16, since $\hat{h}$ is a vector which is previously known through the estimation and s is a matrix which is previously known through Equation 17, $a^b$ may be calculated as $s^{\dagger}\hat{h}$. However, since $s^{\dagger}$ does not accurately exist, the controller estimates a filter coefficient $\hat{a}_j$. Hereinafter, a method for estimating the filter coefficient $\hat{a}_j$ will be described.

The filter coefficient $\hat{a}_j$ according to an exemplary embodiment may be estimated as follows. First, the controller sequentially defines initial vectors based on Equation 16 to Equation 18. Equation 19 represents the sequentially defined initial vectors.

(1): $d = s^H \hat{h}$ (2): $B = s^H s$ (3): $a^b = 0$ (4): $r = Ba^b - d$ (5): $p = -r$ [Equation 19]

In Equation 19, 0 means a zero vector. Next, the controller updates $a^b$ based on Equation 20.

(1): $q = (p^H B p)^{\dagger} r^H r$ (2): $a^b = a^b + qp$ (3): $r_1 = r$ (4): $r = r + qBp$ (5): $\beta = (r_1^H r_1)^{\dagger} r^H r$ (6): $p = -r + \beta p$ [Equation 20]

Here, the controller may iteratively apply Equation 20 according to the predetermined number of times. Thereafter, the controller determines the filter coefficient $\hat{a}_j$ by canceling $e^{-j2\pi f_c d_j}$ (j=0, 1, ..., N−1) commonly included in the respective elements described in Equation 18, from the respective elements of the updated $a^b$. Here, the filter coefficient $\hat{a}_j$ which is finally updated through Equation 19 and Equation 20 may be a complex number.

A filter coefficient $\hat{a}_j$ according to another exemplary embodiment may be estimated as follows. First, a new filter coefficient vector corresponding to the filter coefficient vector $\tilde{h}$ estimated by Equation 16 is defined. The new filter coefficient vector $\tilde{h}$ is represented by Equation 21.

$$\tilde{h}=[\text{real}(\hat{h})\text{imag}(\hat{h})]^T \qquad \text{[Equation 21]}$$

In Equation 21, real($\hat{h}$) and imag($\hat{h}$) each represent a real value vector for each of elements of $\hat{h}$, and an imaginary value vector for each of elements of $\hat{h}$. A new S corresponding to Equation 17 is defined by the following Equation 22.

$$s = \begin{bmatrix} e^{-j2\pi f_c d_0}\text{sinc}(0-d_0W) & e^{-j2\pi f_c d_1}\text{sinc}(0-d_1W) & \ldots & e^{-j2\pi f_c d_{N-1}}\text{sinc}(0-d_{N-1}W) \\ e^{-j2\pi f_c d_0}\text{sinc}(1-d_0W) & e^{-j2\pi f_c d_1}\text{sinc}(1-d_1W) & \ldots & e^{-j2\pi f_c d_{N-1}}\text{sinc}(1-d_{N-1}W) \\ \vdots & \vdots & \ldots & \vdots \\ e^{-j2\pi f_c d_0}\text{sinc}(2c-d_0W) & e^{-j2\pi f_c d_1}\text{sinc}(2c-d_1W) & \ldots & e^{-j2\pi f_c d_{N-1}}\text{sinc}\left(\frac{2c-}{d_{N-1}W}\right) \end{bmatrix} \qquad \text{[Equation 22]}$$

In addition, a matrix $\tilde{s}$ obtained by converting the respective elements of S of Equation 22 into the real value is represented by Equation 23.

$$\tilde{s}=[\text{real}(s)\text{imag}(s)]^T \qquad \text{[Equation 23]}$$

Next, $\hat{a}$ corresponding to Equation 18 is defined by the following Equation 24.

$$\hat{a}=[\hat{a}_0\hat{a}_1 \ldots \hat{a}_{N-1}]^T \qquad \text{[Equation 24]}$$

The controller sequentially defines initial vectors based on those defined in Equation 21 to Equation 24. Equation 25 represents the sequentially defined initial vectors.

(1): $d=\tilde{s}^H\tilde{h}$ (2): $B=\tilde{s}^H\tilde{s}$ (3): $\hat{a}=0$ (4): $r=B\hat{a}-d$ (5): $p=-r$ (Equation 25)

Next, the controller updates $\hat{a}$ based on Equation 26.

(1): $q=(p^HBp)^\dagger r^Hr$ (2): $\hat{a}=\hat{a}+qp$ (3): $r_1=r$ (4): $r=r+qBp$ (5): $\beta=(r_1^Hr_1)^\dagger r^Hr$ (6): $p=-r+\beta p$ [Equation 26]

Here, the controller may iteratively apply Equation 26 according to the predetermined number of times. Next, the controller determines an element $\hat{a}_j$ of the finally updated $\hat{a}$ as a coefficient of the analog filter.

A filter coefficient $\hat{a}_j$ according to still another exemplary embodiment may be estimated as follows. According to a method for estimating the filter coefficient $\hat{a}_j$ according to still another exemplary embodiment, the finally updated $\hat{a}_j$ is a real number. First, an initial $\hat{a}_j$ having a positive real value among elements of the vector $a^b$ of Equation 18 is arbitrarily selected. It is noted that all possible methods for selecting the initial $\hat{a}_j$ are included in the scope of the present invention. Next, the controller iteratively updates $\hat{a}_j$ and determines $\hat{a}_j$ by executing a code described in Equation 27 based on Equation 11, Equation 12, Equation 16, Equation 17, and Equation 18.

Equation 27

```
for iter = 1: NumOFIterations
    for j = 0: N − 1
        y_cancelled = y − A_x̃ sa^b;
```

-continued $$G_1 = 10\log_{10}\left(\frac{1}{M}\sum_{m=0}^{M-1}\left|\frac{y[m]}{y_{cancelled}[m]}\right|^2\right);$$

$\hat{a}_j = \hat{a}_j \times 10^{0.1\Delta}$;
$\tilde{h} = sa^b$;
$y_{cancelled} = y − A_{\tilde{x}}\tilde{h}$;

$$G_2 = 10\log_{10}\left(\frac{1}{M}\sum_{m=0}^{M-1}\left|\frac{y[m]}{y_{cancelled}[m]}\right|^2\right);$$

```
        if G_2 < G_1
            â_j = â_j/10^{0.2Δ};
            h̃ = sa^b
        end
    end
end
```

In Equation 27, NumOFIterations represents a total number of times in which the code is iteratively executed, and $\Delta$ represents a gain step value of attenuation. For example, $\Delta$ may be 0.25 [dB], and an adjustable range of a gain value of attenuation may be limited to 0 [dB] to 31.5 [dB]. It is noted that all possible methods for calculating a gain including a method for calculating SIC gains such as $G_1$ and $G_2$ of Equation 27 are included in the scope of the present invention.

According to the above-mentioned three methods for estimating $\hat{a}_j$, since $\hat{a}_j$ is determined at a time through an operation in a specific time period of the controller, the transmitting and receiving node may be immediately adapted to a surrounding environment even if the surrounding environment of the transmitting and receiving node is changed. According to the exemplary embodiments described above, although the signal of the time domain (the input signal or the received signal of the analog filter, etc.) is used, a signal of a frequency domain (the input signal or the received signal of the analog filter, etc.) may also be used, and the scope of the present invention is not limited thereto.

Figure 6:
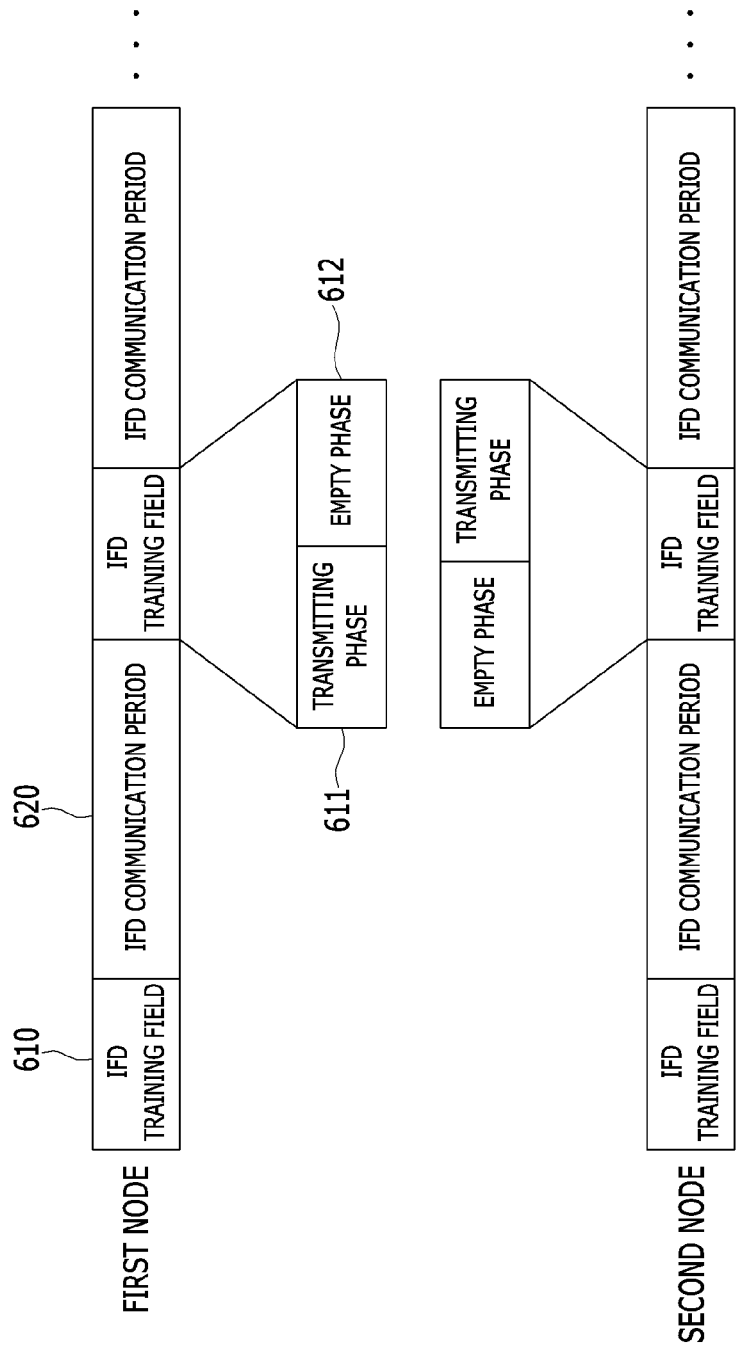
FIG. 6 is concept view illustrating a first protocol used for bidirectional IFD communication between nodes according to an exemplary embodiment.

FIG. 6 is concept view illustrating a first protocol used for bidirectional IFD communication between nodes according to an exemplary embodiment.

The first protocol used for bidirectional IFD communication between nodes according to an exemplary embodiment may be applied to the case in which a first node and a second node, that is, two nodes neighboring each other perform bidirectional IFD communication. Referring to FIG. 6, each node includes an IFD communication period 610 and an IFD training field 620 in a time domain.

In the IFD communication period 610, the first node and the second node may each transmit a desired signal, and receive/restore the desired signal. Each node may perform a cancellation of the self-interference signal across the entirety of a period of the IFD communication period 610.

The IFD training field 620 includes a transmitting phase and an empty phase. In the transmitting phase, each node transmits a training signal, and estimates SIC parameters such as $\hat{x}[m]$, $y[m]$, $\hat{a}_j$, and the like, using a self training signal. For example, each node estimates (e.g., baseband-samples) $\hat{x}[m]$ (or $y[m]$) from an arbitrary self training signal introduced into the receive module, and estimates $y[m]$ (or $\hat{x}[m]$) from a self training signal which is immediately and subsequently introduced into the receive module. Alternatively, each node estimates $\hat{x}[m]$ and $y[m]$ from the arbitrary self training signal introduced into the receive module at the same time. Here, in order for each node to estimate $\hat{x}[m]$ and $y[m]$ at the same time, each node needs to separately have a hardware group (e.g., a down-converter, an AGC, an ADC, etc.) required to estimate $\hat{x}[m]$ and a hardware group required to estimate $y[m]$, all of which are required to convert the self training signal into the baseband signal in one RF signal. However, it is noted that detailed structures (time domain/frequency domain) of all IFD training fields 620 which are optimally designed to estimate the SIC parameters are all included in the scope of the present invention.

Meanwhile, in the empty phase, each node does not transmit any signal and is operated in a receive mode. In the two nodes performing the bidirectional IFD communication between the nodes, the transmitting phase and the empty phase are crossed with each other. That is, while the first node is the transmitting phase, the second node is the empty phase, and while the second node is the transmitting phase, the first node is the empty phase. Referring to FIG. 6, when the first node transmits the training signal in the transmitting phase, a receive module of the first node does not receive a signal transmitted from the second node. According to an exemplary embodiment, the empty phase exists so that each node excellently estimates the SIC parameters in the transmitting phase. That is, each node may more effectively estimate the SIC parameter than the case in which the signal transmitted from the other party node is introduced, that is, interference exists.

Figure 7:
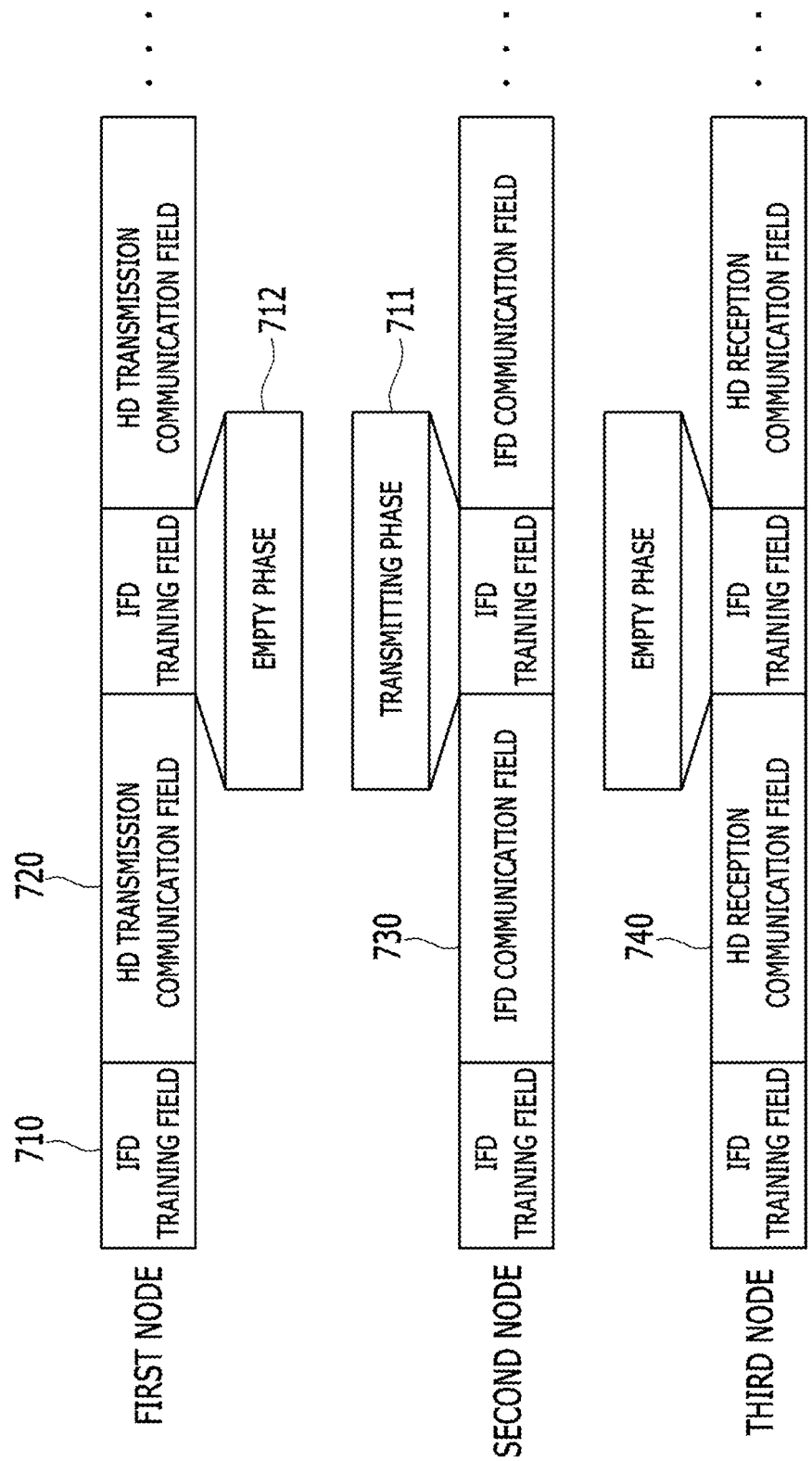
FIG. 7 is concept view illustrating a second protocol used for bidirectional IFD communication between nodes according to another exemplary embodiment.

FIG. 7 is concept view illustrating a second protocol used for bidirectional IFD communication between nodes according to another exemplary embodiment.

The second protocol used for bidirectional IFD communication between nodes according to another exemplary embodiment may be applied to the case in which a first node, a second node, and a third node that is, three nodes neighboring each other perform bidirectional IFD communication. Referring to FIG. 7, the first node includes an HD transmission communication field 720 and an IFD training field 710 in a time domain, the second node includes an IFD communication filed 730 and the IFD training field 710 in the time domain, and the third node includes an HD reception communication field 740 and the IFD training field 710 in the time domain.

The first node is operated in an HD mode in the HD transmission communication field 720 to transmit a desired signal, and does not transmit any signal in the IFD training field 710 so that the second node may effectively estimate the SIC parameters. That is, the IFD training field 710 of the first node is an empty phase 712.

The third node is operated in an HD mode in the HD reception communication field 740 to receive a desired signal, and does not transmit any signal in the IFD training field 710 so that the second node may effectively estimate the SIC parameters. That is, the IFD training field 710 of the third node is also the empty phase 712.

The second node transmits a training signal in the IFD training field 710, thereby estimating the SIC parameters through a self training signal. As a method for estimating the SIC parameters based on the self training signal in the second node, the method described in FIG. 6 may be applied. Further, the second node is operated in an IFD mode in the IFD communication field 730 to receive/restore a desired signal from the first node while transmitting a desired signal to the third node. The second node may perform a cancellation of the self-interference signal using the SIC parameters estimated in the IFD training field 710 across the entirety of the IFD communication field 730.

As described above, according to the exemplary embodiment, by efficiently estimating the filter coefficient of the analog filter for canceling the self-interference signal, it is possible to adapt to change in the surrounding environment across a wide band and it is possible to achieve low cost (a low duty cycle of a memory), low complexity, and low power consumption.

Figure 8:
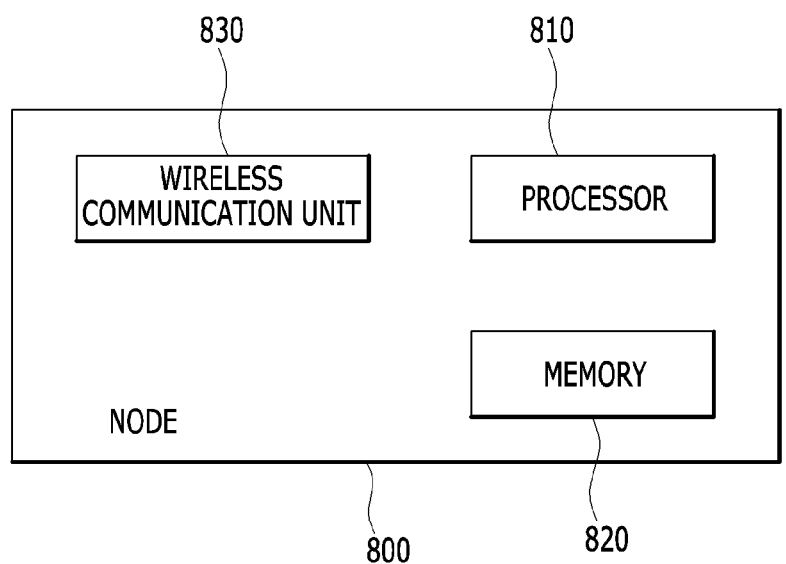
FIG. 8 is a block diagram illustrating a node according to an exemplary embodiment.

FIG. 8 is a block diagram illustrating a node according to an exemplary embodiment.

Referring to FIG. 8, a node 800 includes a processor 810, a memory 820, and a wireless communication unit 830. The memory 820 may be connected to the processor 810 and may store various information for driving the processor 810 or at least one program executed by the processor 810. The wireless communication unit 830 may be connected to the processor 810 and may transmit or receive a wireless signal. The processor 810 may implement the functions, the steps, or the methods proposed by the exemplary embodiments of the present disclosure. Here, a wireless interface protocol layer in a wireless communication system according to an exemplary embodiment of the present disclosure may be implemented by the processor 810. An operation of the node 800 according to an exemplary embodiment may be implemented by the processor 810.

According to the exemplary embodiment of the present disclosure, the memory may be internal or external of the processor, and may be connected to the processor by various means which are already known. The memory is various types of volatile or non-volatile storing medium. For example, memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting and receiving node of an in-band full duplex (IFD) system, the transmitting and receiving node comprising:
   a receive module configured to receive a signal;
   a controller configured to determine a filter coefficient for an analog filter of the node, wherein the analog filter is operated in an analog domain; and
   the analog filter configured to cancel self-interference generated in the received signal by a transmitted signal transmitted from the node based on the filter coefficient,
   wherein the transmitted signal is transmitted in a transmitting phase included in a training field of a time domain, and is not transmitted in an empty phase included in the training field.

2. The transmitting and receiving node of claim 1, wherein: while a neighboring node of the node is operated in the transmitting phase, the node is operated in the empty phase.

3. The transmitting and receiving node of claim 1, wherein: the analog filter is a finite impulse response (FIR) filter.

4. The transmitting and receiving node of claim 1, wherein: the controller is operated in a digital domain.

5. The transmitting and receiving node of claim 4, further comprising: a channel/signal estimator baseband-sampling the transmitted signal and the received signal, wherein the controller determines the filter coefficient based on the baseband-sampled transmitted signal and the baseband-sampled received signal, and a time delay value received from the analog filter.

6. The transmitting and receiving node of claim 5, wherein: the channel/signal estimator baseband-samples the transmitted signal, and then baseband-samples the received signal.

7. The transmitting and receiving node of claim 5, wherein: the channel/signal estimator simultaneously baseband-samples the transmitted signal and the received signal.

8. The transmitting and receiving node of claim 1, further comprising: a distributor transferring the transmitted signal generated from a transmit module of the node to an antenna, transferring the received signal received through the antenna to the receive module, and inputting a self-interference signal by the self-interference to the analog filter.

9. A method for canceling self-interference of a transmitting and receiving node of an in-band full duplex (IFD) system, the method comprising:
   receiving a signal;
   determining a filter coefficient of an analog filter which is included in the node and is operated in an analog domain; and
   canceling self-interference generated in the received signal by a transmitted signal transmitted from the node, based on the filter coefficient,
   wherein the transmitted signal is transmitted when a training field in a time domain is in a transmitting phase and the transmitted signal is not transmitted when the training field is in an empty phase.

10. The method of claim 9, wherein: while a neighboring node of the node is operated in the transmitting phase, the node is operated in the empty phase.

11. The method of claim 9, wherein: the analog filter is a finite impulse response (FIR) filter.

12. The method of claim 9, wherein: the determining of the filter coefficient of the analog filter is performed in a digital domain by a controller of the node.

13. The method of claim 12, further comprising: baseband-sampling the transmitted signal and the received signal, wherein the determining of the filter coefficient of the analog filter includes: determining the filter coefficient based on the baseband-sampled transmitted signal and the baseband-sampled received signal, and a time delay value received from the analog filter.

14. The method of claim 13, wherein: the baseband-sampling of the transmitted signal and the received signal includes baseband-sampling the transmitted signal, and then baseband-sampling the received signal.

15. The method of claim 13, wherein: the baseband-sampling of the transmitted signal and the received signal includes simultaneously baseband-sampling the transmitted signal and the received signal.

16. The method of claim 9, further comprising: transferring the transmitted signal generated from a transmit module of the node to an antenna, transferring the received signal received through the antenna to a receive module of the node, and inputting a self-interference signal by the self-interference to the analog filter.

17. A method for canceling self-interference of a communication node of an in-band full duplex (IFD) system, the method comprising:
   transmitting a first signal and simultaneously receiving a second signal with other communication nodes;
   determining a filter coefficient of an analog filter which is included in the node and is operated in an analog domain; and
   canceling self-interference generated in the second signal by the first signal based on the filter coefficient,
   wherein the first signal is transmitted when a training field of the node is in a transmitting phase and a training field of the other communication nodes is in an empty phase.

* * * * *